US009955015B2

(12) United States Patent
Stifelman et al.

(10) Patent No.: US 9,955,015 B2
(45) Date of Patent: *Apr. 24, 2018

(54) PROVIDING MISSED CALL AND MESSAGE INFORMATION

(71) Applicant: Microsoft Technology Licensing, LLC, Redmond, WA (US)

(72) Inventors: Lisa J. Stifelman, Palo Alto, CA (US); Karen M. Cross, Mountain View, CA (US); Sarah A. Caplener, Santa Cruz, CA (US); Rajeev Khurana, San Ramon, CA (US); Anne K. Sullivan, San Francisco, CA (US); Rao Surapaneni, San Jose, CA (US); Justin B. Ward, Alameda, CA (US); Angus Davis, Sioux Falls, SD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/285,938

(22) Filed: Oct. 5, 2016

(65) Prior Publication Data
US 2017/0026520 A1    Jan. 26, 2017

Related U.S. Application Data

(63) Continuation of application No. 14/324,761, filed on Jul. 7, 2014, now Pat. No. 9,544,436, which is a (Continued)

(51) Int. Cl.
*H04M 1/64* (2006.01)
*H04M 1/56* (2006.01)
(Continued)

(52) U.S. Cl.
CPC ........... *H04M 3/5335* (2013.01); *G10L 15/26* (2013.01); *H04L 51/16* (2013.01);
(Continued)

(58) Field of Classification Search
CPC .... H04M 3/42042; H04M 1/575; H04M 3/02; H04M 15/06; H04M 3/42059;
(Continued)

(56) References Cited

U.S. PATENT DOCUMENTS 4,811,382 A    3/1989  Sleevi
5,652,784 A    7/1997  Blen et al.
(Continued)

FOREIGN PATENT DOCUMENTS

| EP | 585004 | 3/1994 |
| GB | 2316268 | 2/1998 |
| WO | 200161979 | 8/2001 |

OTHER PUBLICATIONS

"Dragon Naturally Speaking Reviews—2004", Nov. 18, 2004, 4 pages.
(Continued)

*Primary Examiner* — Quoc D Tran

(57) ABSTRACT

Information associated with messages and/or missed calls is provided to a subscriber. Calls received but not answered by the subscriber may be monitored. Each monitored call is classified as one of a missed call and a message. The monitored calls may be summarized based on a customizable rule set to create a summary. The summary is provided to the subscriber via, for example, a voice notification.

20 Claims, 9 Drawing Sheets

| Name | Number | Type | Contact ID | times |
|---|---|---|---|---|
| Brad | 4089309050 | Message | <unique id from address book> | 2 |
| M. Smith | 4089769080 | Message | 0 (not in address book) | 1 |
| Blocked | Blocked | Missed | 0 (not in address book) | 1 |
| Laura | 6509309050 | Missed | <unique id from address book> | 1 |

Related U.S. Application Data continuation of application No. 13/960,686, filed on Aug. 6, 2013, now Pat. No. 8,798,239, which is a continuation of application No. 13/351,436, filed on Jan. 17, 2012, now Pat. No. 8,548,130, which is a continuation of application No. 11/301,238, filed on Dec. 12, 2005, now Pat. No. 8,126,120.

(51) Int. Cl.
| H04M 15/06 | (2006.01) |
|---|---|
| H04M 3/533 | (2006.01) |
| H04M 3/48 | (2006.01) |
| G10L 15/26 | (2006.01) |
| H04M 3/53 | (2006.01) |
| H04L 12/58 | (2006.01) |
| H04L 29/12 | (2006.01) |
| H04M 1/57 | (2006.01) |
| H04M 3/487 | (2006.01) |

(52) U.S. Cl.
CPC ........ *H04L 61/1594* (2013.01); *H04M 1/571* (2013.01); *H04M 1/573* (2013.01); *H04M 3/48* (2013.01); *H04M 3/533* (2013.01); *H04M 3/5307* (2013.01); *H04M 15/06* (2013.01); *H04M 3/4872* (2013.01); *H04M 2203/551* (2013.01)

(58) Field of Classification Search
CPC .. H04M 3/4938; H04M 3/5307; H04M 3/493; H04M 3/51; H04M 3/523; H04M 3/5237; H04M 7/00
USPC ........... 379/67.1, 88.11–88.14, 88.19, 88.22, 379/142.01, 142.06; 455/412.1, 415
See application file for complete search history.

(56) References Cited

U.S. PATENT DOCUMENTS

| 5,999,599 | A | 12/1999 | Shaffer et al. |
|---|---|---|---|
| 5,999,611 | A | 12/1999 | Tatchell et al. |
| 6,249,765 | B1 | 6/2001 | Adler et al. |
| 6,741,680 | B2 | 5/2004 | Bates et al. |
| 6,748,058 | B1 | 6/2004 | Schwend |
| 6,792,082 | B1 | 9/2004 | Levine |
| 7,039,585 | B2 | 5/2006 | Wilmot et al. |
| 7,127,058 | B2 * | 10/2006 | O'Connor ........... H04L 12/5855 379/265.01 |
| 7,403,767 | B2 | 7/2008 | Kashanian et al. |
| 7,457,396 | B2 | 11/2008 | Claudatos et al. |
| 7,460,654 | B1 | 12/2008 | Jenkins et al. |
| 7,561,679 | B1 | 7/2009 | Kalbag |
| 7,664,249 | B2 * | 2/2010 | Horvitz ............... H04L 12/2602 370/254 |
| 8,126,120 | B2 | 2/2012 | Stifelman et al. |
| 8,548,130 | B2 | 10/2013 | Stifelman et al. |
| 8,798,239 | B2 | 8/2014 | Stifelman et al. |
| 9,544,436 | B2 * | 1/2017 | Stifelman ............... H04M 3/48 |
| 2003/0007613 | A1 | 1/2003 | MacKlin |
| 2003/0026392 | A1 | 2/2003 | Brown et al. |
| 2003/0128820 | A1 * | 7/2003 | Hirschberg ....... H04M 3/53333 379/88.14 |
| 2004/0137955 | A1 | 7/2004 | Engstrom et al. |
| 2005/0059384 | A1 | 3/2005 | Kuusinen et al. |
| 2005/0117729 | A1 | 6/2005 | Reding et al. |
| 2006/0029195 | A1 | 2/2006 | Mullis et al. |
| 2006/0271630 | A1 | 11/2006 | Bensky et al. |
| 2007/0071186 | A1 | 3/2007 | Sahasrabudhe et al. |
| 2007/0116246 | A1 | 5/2007 | Walker et al. |
| 2008/0256107 | A1 | 10/2008 | Banga |

OTHER PUBLICATIONS

Inanoglu, et al., "Emotive Alert: HMM-Based Emotion Detection in Voicemail Messages" In Proceedings of MIT Media Lab Technical Report No. 585, Jan. 2005, 3 pages.
Koumpis, et al., "Automatic Summarization of Voicemail Messages using Lexical and Prosodic Features", In Proceedings of ACM Transaction on Speech and Language Processing (TSLP), Feb. 2005, 24 pages.
Koumpis, et al., "Transcription and Summarization of Voicemail Speech", In Proceedings of 6th Int. Conf. on Spoken Language Processing, Oct. 16, 2000, 4 pages.
Schmandt, et al., "Voice Interaction in an Ingrated Office and Telecommunications Environment", In Proceedings, American Voice Input/Outpout Society Conference, 1985, 7 pages.
Stifelman, et al., "Not Just another Voice Mail System", In Proceedings of Conference, American Voice 110 Soceity, Sep. 9, 1991, 6 pages.
U.S. Appl. No. 11/301,238, Amendment and Response filed Oct. 26, 2009, 7 pages.
U.S. Appl. No. 11/301,238, Amendment and Response filed Apr. 6, 2010, 16 pages.
U.S. Appl. No. 11/301,238, Amendment and Response filed Sep. 14, 2010, 15 pages.
U.S. Appl. No. 11/301,238, Amendment and Response filed Feb. 17, 2011, 15 pages.
U.S. Appl. No. 11/301,238, Amendment and Response filed Aug. 8, 2011, 15 pages.
U.S. Appl. No. 11/301,238, Notice of Allowance dated Oct. 17, 2011, 5 pages.
U.S. Appl. No. 11/301,238, Notice of Allowance dated Nov. 23, 2011, 4 pages.
U.S. Appl. No. 11/301,238, Office Action dated Sep. 15, 2009, 8 pages.
U.S. Appl. No. 11/301,238, Office Action dated Jan. 13, 2010, 9 pages.
U.S. Appl. No. 11/301,238, Office Action dated Jun. 10, 2010, 9 pages.
U.S. Appl. No. 11/301,238, Office Action dated Nov. 24, 2010, 9 pages.
U.S. Appl. No. 11/301,238, Office Action dated Apr. 21, 2011, 11 pages.
U.S. Appl. No. 13/351,436, 1.312 Amendment and Response filed Aug. 6, 2013, 15 pages.
U.S. Appl. No. 13/351,436, Amendment and Response filed Apr. 16, 2013, 11 pages.
U.S. Appl. No. 13/351,436, Ex Parte Quayle Action dated Jan. 16, 2013, 7 pages.
U.S. Appl. No. 13/351,436, Notice of Allowance dated May 10, 2013, 8 pages.
U.S. Appl. No. 13/351,436, Response to 1.312 Amendment dated Sep. 4, 2013, 2 pages.
U.S. Appl. No. 13/960,686, Amendment and Response filed Dec. 26, 2013, 7 pages.
U.S. Appl. No. 13/960,686, Notice of Allowance dated Mar. 24, 2014, 8 pages.
U.S. Appl. No. 13/960,686, Office Action dated Sep. 26, 2013, 7 pages.
U.S. Appl. No. 14/324,761, Amendment and Response filed Mar. 30, 2015, 12 pages.
U.S. Appl. No. 14/324,761, Amendment and Response filed Aug. 21, 2015, 13 pages.
U.S. Appl. No. 14/324,761, Amendment and Response filed Sep. 21, 2015, 9 pages.
U.S. Appl. No. 14/324,761, Amendment and Response filed Dec. 16, 2015, 13 pages.
U.S. Appl. No. 14/324,761, Amendment and Response filed May 13, 2016, 14 pages.
U.S. Appl. No. 14/324,761, Notice of Allowance dated Jun. 16, 2016, 5 pages.
U.S. Appl. No. 14/324,761, Office Action dated Dec. 29, 2014, 8 pages.

(56) References Cited

OTHER PUBLICATIONS

U.S. Appl. No. 14/324,761, Office Action dated May 28, 2015, 6 pages.
U.S. Appl. No. 14/324,761, Office Action dated Oct. 2, 2015, 8 pages.
U.S. Appl. No. 14/324,761, Office Action dated Mar. 1, 2016, 8 pages.

* cited by examiner

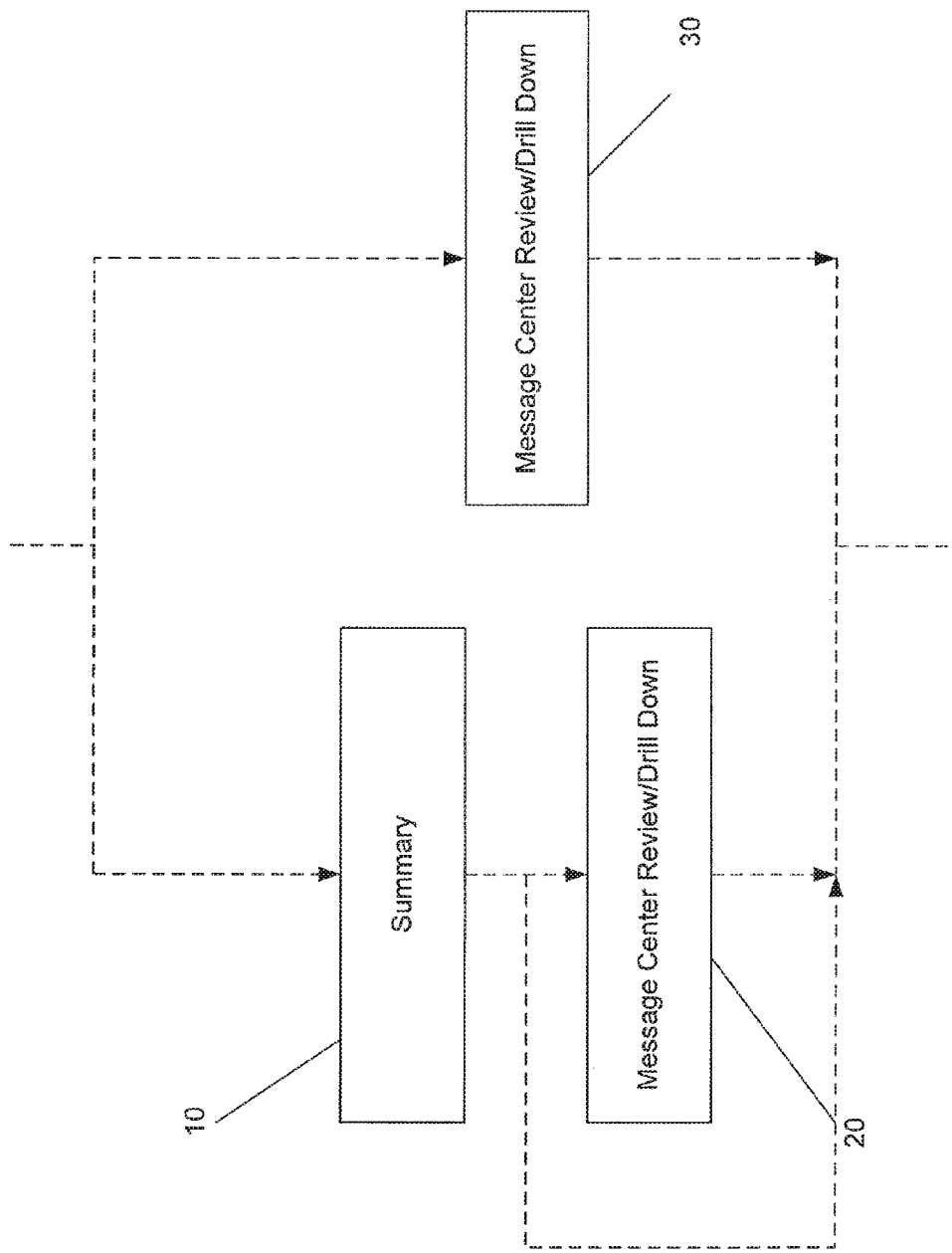

| Notification | | | | | |
|---|---|---|---|---|---|
| Number | Missed Call | | Message | | Prompt |
| | Non-PB | PB | Non-PB | PB | |
| No calls from Phone Book Contacts | | | | | |
| 1 | 1 | 0 | 0 | 0 | You missed a call. |
| 2 | 1 | 0 | 1 | 0 | You got a message and missed a call. |
| 3 | 1 | 0 | >1 | 0 | You got 'n' messages and missed 1 call. |
| 4 | 0 | 0 | 1 | 0 | You got a message. |
| 5 | 0 | 0 | >1 | 0 | You got 'n' messages. |
| 6 | >1 | 0 | 0 | 0 | You missed 'n' calls. |
| 7 | >1 | 0 | 1 | 0 | You got 1 message and missed 'n' calls. |
| 8 | >1 | 0 | >1 | 0 | You got 'n' messages and missed 'n' calls. |
| Calls from Phone Book Contacts | | | | | |
| # Only messages | | | | | |
| 9 | 0 | 0 | 0 | 1 | You got a message from [John]. |
| 9_same* | 0 | 0 | 0 | >1 | You got 'n' messages from [John]. |
| 10 | 0 | 0 | 1 | 1 | You got a message from [John] and 1 other. |
| 11 | 0 | 0 | 1 | >1 | You got messages from [John] and 1 other. |
| 12 | 0 | 0 | >1 | >1 | You got messages from [John] and 'n' others. |
| 13 | 0 | 0 | >1 | 1 | You got a message from [John] and 'n' others. |
| 14 | 0 | 0 | 0 | 2 | You got messages from [John] and [Laura]. |
| 15 | 0 | 0 | 0 | 3 | You got messages from [John], [Laura], and [Kim]. |
| 16 | 0 | 0 | 1 | 2 | You got messages from [John], [Laura], and 1 other. |
| 17 | 0 | 0 | 0 | 3 | You got messages from [John], [Laura], and 'n' others. |
| | 0 | 0 | 1 | >2 | |
| | 0 | 0 | 0 | >3 | |
| # Only missed calls | | | | | |
| 18 | 0 | 1 | 0 | 0 | You missed a call from [John]. |
| 19 | 0 | >1 | 0 | 0 | You missed 'n' calls from [John]. |
| 20 | 1 | 1 | 0 | 0 | You missed a call from [John] and 1 other. |
| 21 | 1 | >1 | 0 | 0 | You missed calls from [John] and 1 other. |
| 22 | >1 | 1 | 0 | 0 | You missed calls from [John] and 'n' others. |
| 23 | 0 | 2 | 0 | 0 | You missed calls from [John] and [Laura]. |
| 24 | 0 | 3 | 0 | 0 | You missed calls from [John], [Laura], and [Kim]. |
| 25 | 1 | 2 | 0 | 0 | You missed calls from [John], [Laura], and 1 other. |
| 26 | 0 | 3 | 0 | 0 | You missed calls from [John], [Laura], and 'n' others. |
| | 1 | >2 | 0 | 0 | |
| | 0 | >3 | 0 | 0 | |
| Both missed calls and messages | | | | | |
| 27 | 0 | 1 | 0 | 1 | You got a message from [John] and missed a call from [Laura]. |
| 27_same* | 0 | 1 | 0 | 1 | You got a message and missed a call from [John]. |
| 27_same* | 0 | 1 | 0 | >1 | You got 'n' messages and missed a call from [John]. |
| 27_same* | 0 | >1 | 0 | 1 | You got a message and missed 'n' calls from [John]. |
| 27_same* | 0 | >1 | 0 | >1 | You got 'n' messages and missed 'n' calls from [John]. |
| All other cases (regardless of the number of messages and missed calls) | | | | | |
| 28 | 0 | 3 | | | You got calls from [John], [Laura] and [Kim]. |
| 29 | 1 | 2 | | | You got calls from [John], [Laura] and 1 other. |
| 30 | >1 | 2 | | | You got calls from [John], [Laura] and 'n' others. |
| | 1 | >2 | | | |
| | >1 | >2 | | | |

* ALL of the received calls were from the same Phone Book contact

Figure 6

| Call Type | Repeat | Call Back | Add to AB | Keep as New | Erase | Next | TMMC |
|---|---|---|---|---|---|---|---|
| Missed Call from Non-Contact | | X | X | | | X | X |
| Missed Call from Adress Book Contact | | [Handle] | [Handle] | | | X | X |
| Missed Call from Blocked Number | | [Handle] | [Handle] | | | X | X |
| Missed Call from Int'l Number, Untrusted Network | | [Handle] | [Handle] | | | X | X |
| Message from Non-Contact | | X | | | X | X | X |
| Message from Address Book Contact | | [Handle] | [Handle] | | X | X | X |
| Message from Blocked Number | | [Handle] | [Handle] | | X | X | X |
| Message from Int'l Number, Untrusted Network | | [Handle] | [Handle] | | X | X | X |

Figure 7

| Time Elapsed | Prompt |
|---|---|
| 0-7 minutes | a few minutes ago. |
| 8-11 minutes | about 10 minutes ago. |
| 12-16 minutes | about 15 minutes ago. |
| 17-22 minutes | about 20 minutes ago. |
| 23-39 minutes | about half an hour ago. |
| 40-49 minutes | about 45 minutes ago. |
| 50-75 minutes | about an hour ago. |
| 76-105 minutes | about an hour and a half ago. |
| 105-135 minutes | about two hours ago. |
| > 135 minutes ago, within the current day, and between 5PM and 12AM | this evening. |
| > 135 minutes ago, within the current day and before 12PM | this morning. |
| > 135 minutes ago, within the current day, after 12PM and before 5PM | this afternoon. |
| on the previous day: (rounded to the nearest half hour) | yesterday, around [2:30 PM]. |
| on the previous day and between 5 PM and 12AM | last night. |
| > 1 day ago, but within the last week: (rounded to the nearest hour) | on Monday, around [2:00 PM] |
| > 1 day ago, but within the last week: (rounded to the nearest hour) | on Tuesday, around [2:00 PM] |
| > 1 day ago, but within the last week: (rounded to the nearest hour) | on Wednesday, around [2:00 PM] |
| > 1 day ago, but within the last week: (rounded to the nearest hour) | on Thursday, around [2:00 PM] |
| > 1 day ago, but within the last week: (rounded to the nearest hour) | on Friday, around [2:00 PM] |
| > 1 day ago, but within the last week: (rounded to the nearest hour) | on Saturday, around [2:00 PM] |
| > 1 day ago, but within the last week: (rounded to the nearest hour) | on Sunday, around [2:00 PM] |
| > 6 days ago | On [January 14th] |

Figure 8

PROVIDING MISSED CALL AND MESSAGE INFORMATION

CROSS-REFERENCE TO RELATED APPLICATION(S)

This application is a continuation of U.S. patent application Ser. No. 14/324,761, filed Jul. 7, 2014 (now U.S. Pat. No. 9,544,436), entitled "PROVIDING MISSED CALL AND MESSAGE INFORMATION," which application is a continuation of Ser. No. 13/960,686, filed Aug. 6, 2013 (now U.S. Pat. No. 8,798,239), entitled "PROVIDING MISSED CALL AND MESSAGE INFORMATION," which application is a continuation of U.S. patent application Ser. No. 13/351,436, filed Jan. 17, 2012 (now U.S. Pat. No. 8,548,130), entitled "PROVIDING MISSED CALL AND MESSAGE INFORMATION," which application is a continuation of U.S. patent application Ser. No. 11/301,238, filed Dec. 12, 2005 (now U.S. Pat. No. 8,126,120), entitled "PROVIDING MISSED CALL AND MESSAGE INFORMATION," the complete disclosures of which are hereby incorporated herein by reference in their entirety.

TECHNICAL FIELD

This invention relates to the field of information services, and more particularly, to providing information related to messages and/or missed calls over, for example, a telephone interface.

BACKGROUND

Conventional voicemail systems apply limited intelligence when presenting a user's messages and/or missed calls. For example, a voicemail system may simply play back the messages received in the order received, and/or present basic information such as the phone number, date, and time of call. More sophisticated voicemail systems may present additional functionality, however the user is often dragged through a prolific number of menus to retrieve the desired information. Instead of advantageously grouping calls when initially presenting information, such that message and missed call review is more efficient, the user is still forced to process call information in an unwieldy and basically serial manner.

SUMMARY

In accordance with one embodiment of the invention, a method of providing information associated with messages and/or missed calls to a subscriber is presented. The method includes monitoring calls received but not answered by the subscriber. Each monitored call is classified as one of a missed call and a message. The monitored calls are summarized based on a customizable rule set to create a summary. The summary is provided to the subscriber.

In accordance with related embodiments of the invention, the summary may include one or more identifiers summarizing the monitored calls. There may be no more than a predetermined number of identifiers. The number of identifiers may be configurable. At least one identifier may be a caller identity associated with at least one monitored call. Summarizing the monitored calls may include performing a reverse lookup in a personal address book related to the subscriber, so as to retrieve the caller identity. The caller identity may be one of a name and a nickname of a caller associated with the at least one monitored call. Summarizing the monitored calls may include using caller ID to identify the caller identity. The caller identity may be associated with a plurality of monitored calls from at least two different phone numbers. Providing the summary may include providing a plurality of caller identities in an order based on when the monitored calls associated with the caller identities were received. One of the identifiers may be a general identifier indicating a number of callers not associated with a caller identity provided in the summary. The general identifier may be provided when the phone number of a calling party associated with a monitored call is blocked or private. The general identifier may be provided when a calling party does not have an associated contact in the personal address book of the subscriber.

In accordance with further related embodiments of the invention, providing the summary may be triggered based on an event. The event may be detecting that the subscriber has gone off-hook, detecting that the subscriber has gone on-line, detecting that the subscriber has pressed a button on a phone, and/or detecting that the subscriber has opened a phone. The message may be a voice message, a video message, an email message, a text message, a multimedia message, an instant message, and/or a voice instant message. The customizable rule set may be defined by the subscriber and/or a service provider. The method may further include providing to the subscriber a command option. The command option may include a drill down command, a return call command, and/or an add to personal address book command. Providing the summary may include providing a voice notification. The voice notification may include providing a pre-recorded name from an audio library, which may be in the subscriber's own voice. Providing the voice notification may include converting text to speech.

In accordance with another embodiment of the invention, a method of providing information associated with messages and/or missed calls to a subscriber is presented. The method includes monitoring calls received but not answered by the subscriber. Each monitored call is classified as one of a missed call and a message. A review of each of the monitored calls is prepared based on a customizable rule set. The review is provided to the subscriber.

In accordance with related embodiments of the invention, the review is provided to the subscriber upon the subscriber accessing a message center. The review may group the monitored calls into one or more groups. The subscriber may have random access to one of the groups. Preparing the review may include determining whether each of the monitored calls is from a caller identity associated with a personal address book related to the subscriber, wherein grouping the monitored calls includes grouping the monitored calls by caller identity. Grouping the monitored calls may be a function of whether the caller identity is one of a user-defined group. The calls in each group of callers may be sorted in an order. The order may be based on time, urgency, a number of calls made by a caller identity, and/or whether the monitored call is associated with a personal address book of the subscriber. The review may include a time of at least one of the monitored calls. The time may be an elapsed time since the monitored call, or an approximate time of call. The review may further include providing the subscriber with command options, such as a return call command and/or an add to personal address book command.

In further related embodiments of the invention, providing the review may include providing a voice response. The voice response may be a pre-recorded name from an audio library, which may be recorded in the subscriber's own voice. Providing the voice response may include converting text to speech. Preparing the review may include grouping the monitored calls into one or more threads. Grouping the monitored calls into one or more threads may include converting speech of at least one message to text, searching the text for at least one word, and grouping the monitored calls based on whether the text was found.

In accordance with another embodiment, a system for providing information associated with messages and/or missed calls to a subscriber is presented. The system includes a monitoring agent for monitoring calls received but not answered by the subscriber. A classification module classifies each monitored call as one of a missed call and a message. A summarizing module summarizes the monitored calls based on a customizable rule set to create a summary. A notification module provides the summary to the subscriber.

In accordance with related embodiments of the invention, the summary may include one or more identifiers summarizing the monitored calls. There may be no more than a predetermined number of identifiers. The number of identifiers may be configurable. At least one of the identifiers may include a caller identity associated with at least one monitored call. The caller identity may be retrieved from a personal address book associated with the subscriber. The caller identity may be a name or a nickname of a caller associated with the at least one monitored call. The caller identity may be retrieved using caller ID. The caller identity may be associated with a plurality of monitored calls from at least two different phone numbers. One of the identifiers may be a general identifier indicating a number of callers not associated with a caller identity provided in the summary. The general identifier may pertain, at least in part, to a monitored call having a phone number of a calling party that is blocked or private. The general identifier may pertain, at least in part, to a monitored call not associated with the personal address book of the subscriber.

In accordance with further related embodiments of the invention, a trigger module may provide a trigger to the notification module, with the notification module providing the summary notification to the subscriber upon receiving the trigger. The trigger may provide the trigger to the notification module upon detecting that the subscriber has gone off-hook, detecting that the subscriber has opened a phone, detecting that the subscriber pressed a button on a phone, and/or detecting that the subscriber has gone on-line. The message may be a voice message, a video message, an email message, a multi-media message, instant message, a voice instant message, and a text message. The customizable rule set may be defined by at least one of the subscriber and a service provider. The notification module may include a voice module for providing the review to the subscriber via speech. The voice module may include an audio library of at least one pre-recorded name, which may be recorded in the subscriber's own voice. The voice module may be capable of converting text-to-speech.

In accordance with another embodiment of the invention, a system for providing information associated with messages and/or missed calls to a subscriber is presented. The system includes a monitoring agent for monitoring calls received but not answered by the subscriber. A classification module classifies each monitored call as one of a missed call and a message. A review module prepares a review of each of the monitored calls based on a customizable rule set. A response module provides the review to the subscriber.

In accordance with related embodiments of the invention, the response module may provide the review to the subscriber upon the subscriber accessing a message center. The review module may divide the monitored calls into two or more groups. The response module may provide to the subscriber random access to one of the groups. At least one of the monitored calls may be from a caller identity associated, for example, with a personal address book related to the subscriber and/or a caller ID associated with the monitored call. At least one group of calls may be from a single caller identity associated with a plurality of monitored calls from at least two different phone numbers. The groups may be a function of whether the caller identity is one of a user-defined group. The calls in each group may be sorted in an order. The order may be based on time, urgency, a number of calls made by a caller identity, and/or whether the monitored call is associated with a personal address book of the subscriber. The review may include a time of at least one of the monitored calls. The time may be an elapsed time since the monitored call, or an approximate time of call.

In further related embodiments of the invention, the response module may include a voice response module for providing the review to the subscriber by speech. The response module may provide the subscriber with command options, such as a return call command and/or an add to personal address book command.

BRIEF DESCRIPTION OF THE DRAWINGS

The foregoing features of the invention will be more readily understood by reference to the following detailed description, taken with reference to the accompanying drawings, in which:

FIG. 1(a) is a flow diagram illustrating voice notification and message center access, in accordance with one embodiment of the invention;

FIG. 6 is an exemplary table illustrating voice notifications based on monitored calls, in accordance with one embodiment of the invention;

FIG. 7 is an exemplary table illustrating message prompts provided by a message center based on the type of missed call or message, in accordance with one embodiment of the invention; and FIG. 8 shows exemplary voice prompts provided by the message center with regard to the time the missed call or message was received.

DETAILED DESCRIPTION

In illustrative embodiments of the invention, messages and/or missed calls made to a subscriber are summarized. When integrated with a personal address book, the summary may efficiently provide both the number of missed calls and messages, and names of callers. The subscriber may be provided with the summary of missed calls and messages upon going off-hook. A more detailed review of each missed call and message may be provided by accessing a message center.

FIG. 1(a) is a flow diagram illustrating summarization of messages and/or missed calls and message center review/drill down, in accordance with one embodiment of the invention. Upon a triggering event, such as the subscriber going off-hook, a summary 10 of the missed calls and/or messages is provided. Summary 10 provides a succinct and concise statement of the monitored calls. Summary 10 may be created using, for example, a customizable rule set. Summary 10 may be provided to the subscriber via, without limitation, a voice notification. Upon hearing summary 10, the caller may then access a message center review/drill down 20 to receive a review via, without limitation, a voice interface. Message center review/drill down 20 provides more detailed information about each of the missed calls and/or messages. The subscriber may choose to listen to each message received, or a subset of the messages received. The missed calls and/or messages presented during message center review/drill down 20 may be advantageously grouped and/or ordered to make the review more efficient. If desired, the subscriber may skip the summary 10 and immediately access message center review/drill down 30. Furthermore, at any point, the caller may interrupt the summary 10 or message review/drill down 20 and 30 and proceed, for example, with a call.

Figure 1B:
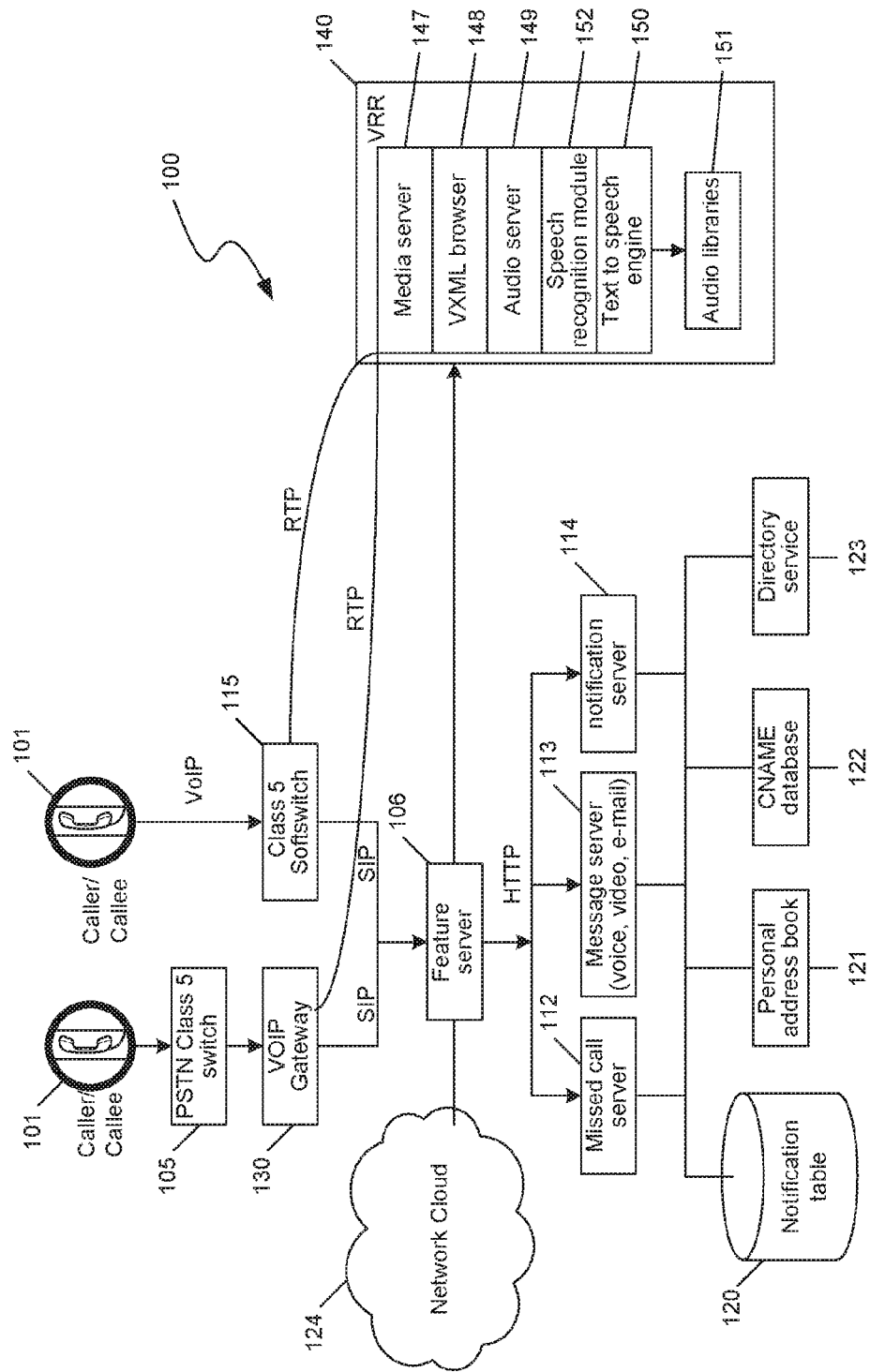
FIG. 1(b) is a block diagram of a system architecture for monitoring missed calls and messages, and for providing voice notification, in accordance with one embodiment of the invention.

FIG. 1(b) is a block diagram of a service provider system architecture 100 for monitoring missed calls and/or messages, and for providing a summary of the missed calls and messages and/or a message center review, in accordance with one embodiment of the invention. In such an architecture, a subscriber 101 may place or receive calls through any suitable medium, such as a Public Switched Telephone Network (PSTN) 103 or through Voice Over Internet Protocol (VOIP). If a subscriber 101 initiates or receives a call via the PSTN, the call passes through a class 5 switch 105. If the subscriber initiates or receives a call via VOIP, the call passes through a softswitch 115 that mimics a class 5 PSTN switch.

A Monitoring Agent (MA) resides at both the softswitch 115 and at the PSTN class 5 switch 105. The MA monitors subscriber activities at the PSTN Class 5 switch 105 or softswitch 115 and interfaces with a feature server 106 when triggered or otherwise appropriate. If the call is processed through the PSTN, the MA interfaces with the feature server 106 via a VOIP gateway 130. If the call is VOIP, a softswitch 115 connects the call to feature server 106. The protocol used between feature server 106 and VOIP gateway 130 or soft switch 105 may be, without limitation, SIP (Session Initiation Protocol).

Feature server 106 performs intelligent call and/or message control. For example, upon receiving information from the MA, feature server 106 may either provide and/or initiate a session with various services on, without limitation, a web server. These services include, without limitation, a missed call server 112, a message server 113, and a notification server 114. Servers 112, 113 and 114 combine to provide the functionality required by feature server 106 to monitor, process, and intelligently notify the subscriber of any missed calls and messages. Servers 112, 113, and 114 may create or have access to various databases or service in assisting with this functionality, such as a notification table 120, a personal address book 121, a CNAME database 122, and/or a directory service 123. The services and functionality provided to the subscriber may be based on which services he subscribes to. The communication protocol between feature server 106 and these other servers 112, 113 and 114 may be, for example, HTTP (Hypertext Transfer Protocol).

For voice recognition and/or to generate summary voice notifications or message center review responses back to the subscriber, feature server 106 may initiate a session with an Interactive Voice Recognition and Response (IVRR) server 140 using, for example, SIP. IVRR server 140 obtains the IP address of either VOIP gateway 130 or a VOIP telephone from feature server 106 during the SIP communications. For example, feature server 106 may provide IVRR server 140 with text that IVRR server 140 converts into a voice signal using a text-to-speech application. IVRR server 140 transfers the speech to VOIP gateway 130 or directly to the VOIP phone using real-time protocol (RTP). IVRR 140 may include, but is not limited to, a media server 147, a voice extended markup language (VXML) browser 148, an audio server 149, a speech recognition module 152, and a text to speech engine 150, which may further include several audio libraries 151.

Figure 2:
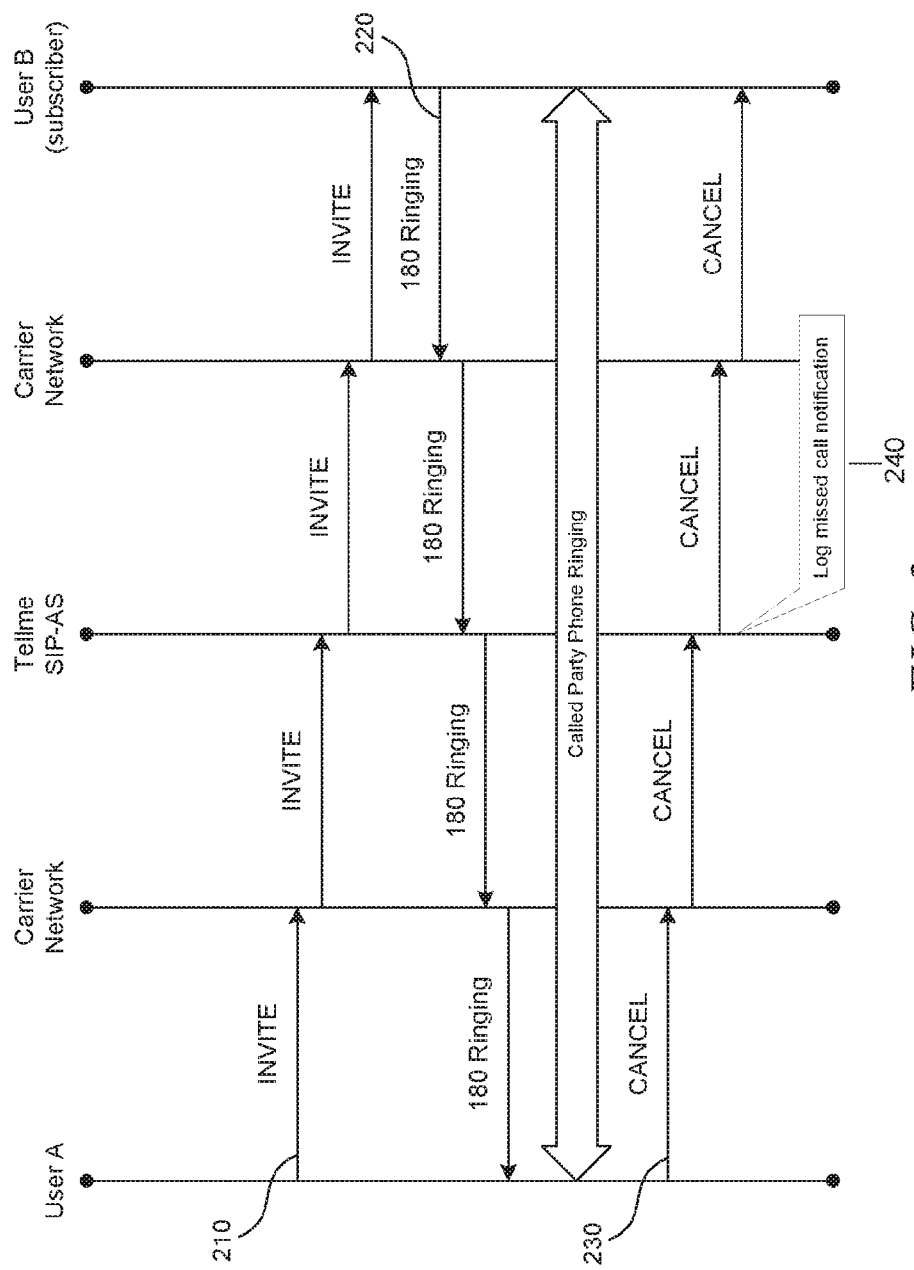
FIG. 2 shows an exemplary signal flow diagram for capturing missed call information, in accordance with one embodiment of the invention.

FIG. 2 shows an exemplary signal flow diagram for capturing missed call information, in accordance with one embodiment of the invention. A caller initiates a VOIP call to the subscriber and passes an invite 210 via a carrier network through soft switch 115. The MA at soft switch 115 acts as a proxy server and notifies feature server 106 of this event, and the invite 210 is routed to the subscriber. Upon receiving invite 210, the subscriber sends a ring response 220 to the caller, and the subscriber's phone rings. Upon the caller hanging up, a cancel signal 230 is detected by the MA. The MA notifies feature server 106 of the cancel signal 230. Feature server 106 then proceeds to initiate a session with one or more services to log the missed call notification 240. Information pertaining to the missed call may be stored, for example, in a notification summary table, as described below in connection with FIG. 4.

Feature server 106 may receive message information from a variety of entities in various formats. For example, the messages delivered may include, without limitation, a voice message, an email message, a video message, a multi-media message, an instant message, a instant message and/or a text message. The methods in which these messages may be delivered include, for example, a phone call, email, a chat session, a video display, and/or text messaging. The messages may be sent to a feature server and/or message server via, without limitation, a PSTN and/or a network, such as the Internet. The message itself may be stored at, without limitation, the service provider's network, the user's terminal such as the user's handset or computer, and/or at a third party repository.

Figure 3:
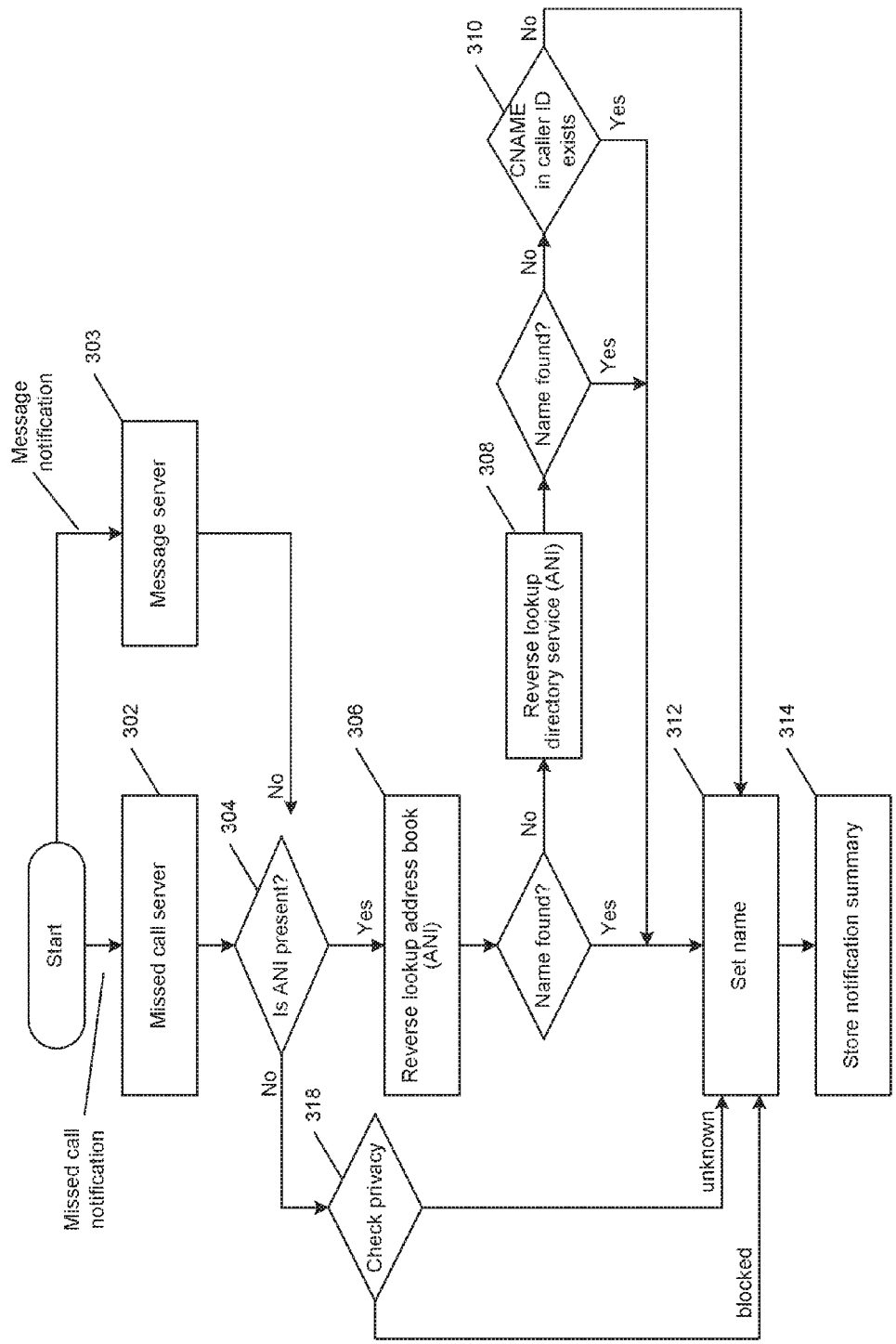
FIG. 3 shows an illustrative process for consolidating message and missed call information in a notification summary table, in accordance with one embodiment of the invention.

FIG. 3 shows a process for consolidating message and/or missed call information in a notification summary table, in accordance with one embodiment of the invention. The process begins at either step 302, in which missed call server 112 receives a missed call notification from the feature server 106 or step 303, in which message server 113 receives a message notification from feature server 106.

Upon monitoring the missed call and/or message, the presence of associated call party information is determined in step 304. For example, Automatic Number Identification (ANI) includes the calling party's phone number, and is typically sent by a telephone company along with a request for connection, which rings the subscriber's phone. In various embodiments, caller ID may be provided with the call, and includes the name of the calling party.

If ANI is present and provides the caller's phone number, a reverse lookup in the subscriber's personal address book 121 is performed to determine the contact name and/or identity of the caller, step 306. The personal address book 121 is a database that stores the subscriber's contacts, including for example, the names, addresses, email addresses and/or telephone numbers of the contact. The personal address book 121 may be stored at, without limitation, the service provider's network, at the user's terminal such as the user's handset or computer, and/or at a third party repository. Traditionally, contacts in the personal address book 121 may be added or deleted manually via, without limitation, the subscriber's cellular phone or home phone. In illustrative embodiments of the invention, more proactive techniques for updating the personal address book 121 may include, for example, providing the subscriber the option to update the personal address book 121 upon the subscriber calling a number, or upon the caller stating "call back" when listening to messages or missed calls.

If a match is not found in the subscriber's personal address book 121, the service provider may check sources other than the personal address book of the subscriber to determine the name and/or identity of the caller. For example, a reverse look up may be performed comparing the phone number retrieved in the ANI with a shared directory service or a directory assistance database 123 to determine the name of the caller, step 308. If a match is still not found, a Calling Name Delivery (CNAME) network query may be performed, step 310. Furthermore, if the call is a wireless call, ANI II may be consulted. In various embodiments, the service provider may determine the best source of information on which to base the voice notification. For example, personal address book 121 of the subscriber may be the best source since the subscriber may have, for example, indicated preferences as to how each caller should be referred as, such as a nickname (e.g., the voice notification for "Sarah Clone" should be "Mom").

Figure 4:
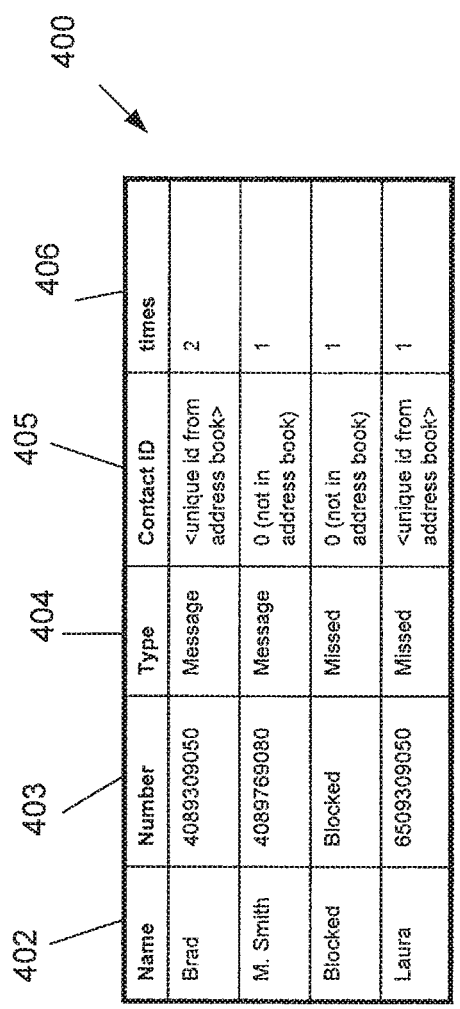
FIG. 4 is an exemplary notification summary table, in accordance with one embodiment of the invention.

If the name or identity of the calling party is found, that name is associated with the monitored call, step 312. Information pertaining to the missed calls and/or messages is then stored in a notification summary table in step 314. The notification summary table may be stored at, without limitation, the service provider's network, at a user terminal such as the user's handset or computer, and/or at a third party repository. An exemplary notification summary table 400 is shown in FIG. 4, in accordance with one embodiment of the invention. Table 400 includes a name 402 and number of a caller 403, along with type (message or missed call) 404, whether the contact is in the personal address book 405, and the number of calls the caller made 406. Note that in step 304, if it is determined that ANI is not present, a privacy check is performed in step 318 to determine whether the caller name is blocked or simply unknown. This information may be provided in the notification summary table 400 under the column associated with the name of the caller 402.

Figure 5:
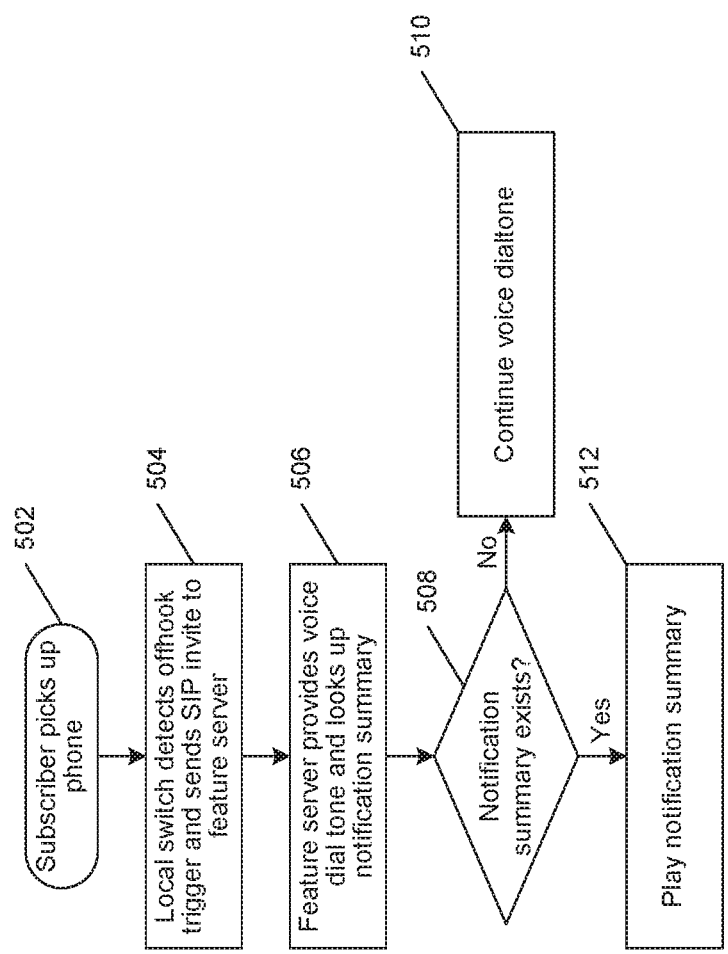
FIG. 5 shows an illustrative process for notifying a subscriber of both missed calls and messages, in accordance with one embodiment of the invention.

FIG. 5 shows a flowchart for providing a notification to a subscriber that includes a summary of both missed calls and messages, in accordance with one embodiment of the invention. The notification of the missed calls and messages may be initiated when the subscriber picks up the phone, step 502. It is to be understood that the notification may also be triggered by other events, such as a called party hanging up the phone, or going on-line when using a softphone. Still other triggering events may include the subscriber opening a phone, or pressing a button on a phone. Upon the local switch detecting the off-hook trigger, an SIP invite is sent to feature server 106, step 504. Feature server 106 may then provide a voice dial tone in which all features of the service provider are enabled, including summary notification of missed calls and/or messages. Other features provided by the service provider may include, without limitation, voice dialing, message center, personal address book, games, and system settings. In various embodiments, the subscriber may be provided with other default dial tones that disable all or some of the features made available by the service provider. When notification of missed calls and/or messages is disabled, a stutter dial tone may be played, for example, if there are any new missed calls and/or messages. In such embodiments, the subscriber may, upon for example pressing certain DTMF keys, switch their default dial tone to the voice dial tone.

When a voice dial tone that enables summary notifications is provided, and upon receiving the SIP invite, feature server 106 accesses notification summary table 400 in step 506, and determines whether there are any entries in notification summary table 400 in step 508. If there are no entries, the subscriber will continue to hear the voice dial tone and select options made available by the service provider, step 510. If there is an entry, a summary of the monitored missed calls and/or messages is provided via, without limitation, a voice notification, step 512. In various embodiments, the summary may be provided to the subscriber by other communication means known in the art, such as a video and/or multi-media notification.

The summary contained in the voice notification may provide the names of various callers using pre-recorded names in an audio library 151. The prerecorded names may be, for example in the subscriber's own prerecorded voice, or a voice provided by the service provider. Alternatively, the summary may provide the name of a caller by converting the text of the caller's name found in the personal address book to speech. This may be accomplished using, without limitation, a high quality text-to-speech conversion program, as known in the art. The summary may provide the entire name of the caller as entered in the personal address book, or may provide a shortened nickname, which may be, without limitation, a user provided nickname stored in the personal address book of the subscriber.

Since the voice notification may occur as soon as the subscriber picks up the phone, it is vital that the summary provided in the voice notification be efficient. The most relevant information is generally provided first. For example, a caller that called repeatedly may be presented first, as it may be indicative of some urgency. Upon receiving the summary, the subscriber may have the option, for example, to access the message center to drill down and get more detailed information about a particular call, return a call, add the caller to the subscriber's personal address book, or select other options available through the service provider.

In illustrative embodiments of the invention, the summary of missed calls and messages provided in the voice notification in step 512 is a function of classifying each monitored call as one of a missed call or a message; and determining whether each of the monitored calls is from a caller associated with a personal address book related to the subscriber or optionally, another source. More particularly, generating the summary may include, without limitation: determining the number of missed calls not associated with the personal address book; determining the number of missed calls associated with the personal address book; determining the number of messages not associated with the personal address book; determining the number of messages associated with the personal address book; and determining the number of monitored calls from the same caller across one or more phone lines.

Customizable rules may advantageously be applied in generating the summary in the voice notification. The rules may be heuristic or empirically based and may take into account, without limitation, typical human weighting of the importance of the monitored calls. For example, if many calls are received from the same caller in a certain period of time, this may indicate some urgency to the calls which may weigh heavily on notification.

In illustrative embodiments, the summary may include one or more identifiers to summarize the monitored calls. The number of identifiers in the summary may be no more than a predetermined number. In this manner, the subscriber does not have to listen to an overly long notification upon, for example, going off-hook, but rather hears a concise summary. In some embodiments, the predetermined number of identifiers is, without limitation, three. The predetermined number of identifiers may be a configurable parameter within the service provider system architecture 100. For example, the predetermined number of identifiers may be user configurable.

The identifiers may be of various types. A first type of identifier is a caller identity that includes a caller name associated with one or more monitored calls. As described in above embodiments, the caller name may be, for example, retrieved from a reverse lookup performed using the subscriber's personal address book or other source. This first type of identifier may also include, in addition to the caller name, other minimal information, such as the number of monitored calls received from that caller and a time associated with one or more of the calls. In various embodiments, only those calls from ANI's found in the user's personal address book are included by name in the summary. This may be user configurable.

An example of a voice notification with three identifiers, each identifier being a caller identity is: "You missed calls from John, Kim and Laura." The order that the caller names are presented may be based on when the monitored calls associated with the caller identities were received. If the same caller made multiple calls, even from different numbers, the voice notification may advantageously group these calls together into one identifier. For example, assume the following calls are monitored: a message from Brian (cell phone), a missed call from Brian (home phone), and a message from Leo. The voice notification may be "You got calls from Brian and Leo."

Another type of identifier may be a general identifier that indicates, without limitation, a number of callers not associated with a caller identity provided in the voice notification. An example of a voice notification with three identifiers, with two identifiers being a caller identity and one identifier being a general identifier is: "You got messages from Mark, Brian and 3 others." The general identifier may be used when, without limitation, there are more than a predetermined number of identifiers that can be provided; when the call number is blocked or private; and/or the caller does not have an associated contact in the personal address book of the subscriber. For example, assume the following calls are monitored: a message from Mom, a message from Brian, a missed call from Mom, a message Brian, a missed call from 650-940-3458, a blocked number, and a missed call from Lauren. The voice notification may be "You got calls from Mom, Brian, and 3 others."

FIG. 6 is a table illustrating exemplary voice notifications that may be provided based on the monitored calls, in accordance with one embodiment of the invention. As can be seen, generating the voice notification may include determining: whether one or more of the monitored calls are associated with the subscriber's personal address book; whether the monitored calls include only missed calls; whether the monitored calls include only messages; and whether the monitored calls include both missed calls and messages.

As shown in FIG. 6, if none of the monitored calls are associated with a contact in the subscriber's personal address book, generating a voice notification includes providing the number of missed calls and/or the number of messages, without use of an identifier. For example, if a message and a missed call are received which are not associated with the subscriber's personal address book, the voice notification provided to the subscriber may be: "You got a message and missed a call."

If the monitored calls include only messages or only missed calls and at least one of the calls is associated with a contact in the subscriber's personal address book, the voice notification indicates that the subscriber received a message(s) or missed call(s), respectively, from an identifier(s). For example, if the subscriber receives a message from Mom, a message from Brian, another message from Mom, and a message from John, the voice notification provided to the subscriber may be "You got messages from Mom, Brian and John." If the monitored calls include both messages and missed calls, the voice notification provided to the subscriber indicates, for example, "You got calls from Mom, Brian and John."

If the monitored calls are each associated with the same contact in the subscriber's personal address book, the voice notification provided to the subscriber indicates the number of missed calls and/or the number of messages received from the caller. For example, the voice notification provided to the subscriber may be: "You got 1 message and missed 2 calls from John."

Upon hearing a voice notification, the subscriber can provide commands to, without limitation, automatically return a call with voice dialing, drill down further to receive more information about a particular call, or place a new call. For example, if the voice notification provided to the subscriber is "You got messages from Laura and Mom . . . ," the subscriber may interrupt and say "call Mom," initiating a call to Mom. Alternatively, to get more detail and drill down on each call, the subscriber may access a message center by, without limitation, saying "message center."

Using, without limitation, a voice interface, the message center plays back a review of the subscriber's missed calls and/or messages. It is to be understood that message center functionality may be distributed across one or more components and/or locations. For example, message center functionality may be provided at the service provider and/or the subscriber's phone.

Presentation of the messages and missed calls by the message center may be based on subscriber selected preferences for grouping, ordering, and/or threading. Alternatively, the service provider may have predefined rules for grouping, ordering and/or threading, which may then be, without limitation, customized by the subscriber. Messages and missed calls may be grouped, for example, by contact and/or whether the contact is, without limitation, a family, friend, work associate, or sports team member. Examples of ordering include sorting by, for example, time of call, importance of the group, and/or urgency of the message (e.g., a number of calls made by the same caller identity).

More generally, the grouping, ordering and/or threading may be based on various metadata regarding the monitored calls. Such metadata may include, without limitation, particular words used in a message (e.g., a thread may group all monitored calls that mention soccer), caller id, and/or date.

In various embodiments, retrieval of the caller's name from the subscriber's personal address book may allow the message center to effectively group and present missed calls and/or messages. Calls by the same contact may be grouped, albeit missed calls and/or messages, so that all the information someone needs about a contact (such as how many times they called, any messages, and the time-stamps of their calls) is summarized together rather than being dispersed by calls from other contacts. This makes message and missed call review by the subscriber more efficient.

In grouping calls by the same contact, missed calls and/or messages from the same phone number representing the contact, along with missed calls and/or messages from other phone numbers representing the same contact, may be grouped together. For example, if the subscriber receives a missed call from Brian (home phone) and a missed call from Brian (cell phone), the response provided by the message center may be "You missed 2 calls from Brian. The last one came in about an hour ago." In various embodiments, users may have multiple names listed for the same phone number. The name that is played back may then be based on the user's outgoing calls. For example, the name that was most recently used to make an outgoing call to that number will be played back. If a subscriber has never voice dialed the number in question, then the name that was most recently added to the subscriber's personal address book will be played back.

When there is greater than 1 missed call from the same phone number or same contact, the time may advantageously be given for only the most recent call. Thus, the subscriber is not overburdened with the times of every missed call.

When there is greater than one message from the same phone number or same contact, the message center may indicate the total number of messages from that phone number or contact, followed by each message preceded with its order in the list and a relative time stamp. Navigational commands may be played after each indication of a message. For example:
System: You got 3 messages from John. The first one's from around 10 AM.
　Hey, gimme a call back when you get this.
　You can say Call Back, Erase, Next or Tell Me My Choices.
Subscriber: Next
System: The second one's from around 11 AM.
　Hey, I'm heading out so call me on my cell phone.
　You can say Call Back, Erase, Next or Tell Me My Choices.
Subscriber: Next
System: And, this one came in around noon.
　Guess you're still not around. Hope to talk to you soon.
　You can say Call Back, Erase, Next or Tell Me My Choices.

When there's a combination of missed calls and messages from the same phone number or the same contact, the details/breakdown of calls from that person may be given. Each message may then be preceded with its order in the list and a relative time stamp. Navigational commands are played after each message. For example, if there is one missed call and one message, the voice response provided by the message center may be "You missed a call from John and got this message around 10 AM . . . ." If there were multiple missed calls and one message, the voice response provided by the message center may be "You missed 2 calls from John and got this message around 10 AM . . . ." If there was one missed call and multiple messages, the voice response provided by the message center may be "You missed a call from John and got 2 messages. The first one's from around 10 AM . . . ." If there were multiple missed calls and multiple messages, the voice response provided by the message center may be "You missed 2 calls and got 2 messages from John. The first one's from around 10 AM . . . ."

The message center may play back the missed calls and/or messages in the following exemplary order. Calls within any of these categories are played back in chronological order (from least recent to most recent). Calls from the same phone number or same contact may be grouped together, as described above. Note that in addition to providing the missed calls and/or messages in a particular order, the message center may also provide to the subscriber the capability to randomly access one or more groups.

1. All missed calls and/or messages associated with a contact in the subscriber's personal address book.
2. All remaining calls, excluding missed calls from blocked numbers.
3. All missed calls from blocked numbers are grouped together. These may be counted individually.

In various embodiments, particular words used in a message may be used to form threads of messages, as described above. In such embodiments, the speech to text/speech recognition engine may be capable of searching messages received for a user-definable word or phrase. Messages including the user-definable word or phrase are grouped together as a thread, which may be further sorted and/or grouped by, without limitation, time and/or caller identity.

FIG. 7 is a table illustrating navigational command voice prompts provided by a message center based on the type of missed calls or messages, in accordance with one embodiment of the invention. Navigational command voice prompts may be provided by the message center upon, without limitation, playing missed calls and messages, as described above. For example, the command voice prompt may depend on, without limitation: whether the missed call and/or message is a contact in the subscriber's personal address book, or a blocked number, whether due to user preference or network restrictions, and/or if it is a missed call or message.

FIG. 7 specifies, without limitation, which voice command prompts are played for each missed call/message type. Commands with an "X" are in the main prompt. Upon receiving the main prompt, the subscriber may be provided with further options by stating, for example, "Tell me my choices." Commands in highlighted cells are in the Tell Me My Choices prompt "[Handle]" signifies that a command has special handling for that call type.

For example, for a missed call from a non-contact, here are the appropriate prompts:
Main Prompt: You can say Call Back, Add to Address Book, Next or Tell Me My Choices.
Tell Me My Choices Prompt: Here're all your choices. You can say Repeat, Call Back, Add to Address Book, Keep as New, Erase or Next.

FIG. 8 shows exemplary voice responses provided by the message center with regard to the time the missed call or message was received. These times may be calculated based on the time zone of the subscriber's home phone number.

As shown in FIG. 8, the times provided by the message center may advantageously be presented as the time elapsed since the missed call or message, as opposed to conventional voicemail systems that provide the time of the missed call or message. The time may also be given in approximate measures.

A benefit of using a relative time instead of an exact time (e.g., "around noon" instead of 12:04 pm) is that it more closely matches the way people naturally speak. Therefore, it more closely resembles how user's perceive time, making it quicker and easier for them to process the information. For example, instead of thinking '2:23 pm' a subscriber may think 'a few minutes ago', or 'two hours ago'. It also gives a better sense of immediacy (e.g., "Jane called a few minutes ago" rather than "Jane called at 5:42 pm"). Providing elapsed time is also more efficient than a hearing a long time prompt, such as "Message 1 received on Thursday, April 8 to at eight thirty eight pm."

In various embodiments, a missed call or message may be marked as old and may consequently be accessed by the subscriber saying, for example, "past calls." Within the message voice interface, a missed call or message may be marked as old when, without limitation, the subscriber says any of the following in response to the missed call review: 'Call Back', 'Add to Phone Book', 'Repeat', 'Next', 'Erase', 'Save'. Additionally, a missed call may be marked as old if the subscriber voice dials a contact after hearing that contact's name within a call notification that occurs, for example, upon the subscriber going off-hook. When this occurs, all missed calls from that contact may be marked as old.

In various embodiments, calls may be erased, for example by the user saying 'Erase' on the voice interface, so that they are, without limitation, permanently removed from the 30 message center, or moved to a 'deleted messages' folder. Missed calls from blocked numbers may be automatically removed from the message center. Missed calls and/or messages may also be marked as new, such that they are not classified as "a past call" and are reviewed upon accessing the message center.

In various embodiments, the disclosed methods may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method implemented by a computer system for organizing voice mail messages and instant messages, comprising:
   receiving one or more voice mail messages;
   performing speech recognition on the one or more voice mail messages to convert speech of the one or more voice mail messages to text of the one or more voice mail messages;
   receiving one or more instant messages;
   analyzing, by the computer system, the one or more voice mail messages and the one or more instant messages to identify at least one important voice mail message and at least one important instant message, wherein the at least one important voice mail message and the at least one important instant message are identified based at least in part on evaluating a user preference; and
   grouping the text of the at least one important voice mail message and the at least one important instant message.

2. The method of claim 1, wherein the analyzing is based on a rule set.

3. The method of claim 2, wherein the rule set is customized.

4. The method of claim 2, wherein at least one rule of the rule set is one of: heuristically based and empirically based.

5. The method of claim 2, wherein one or more rules of the rule set take into consideration a human weighting of importance.

6. The method of claim 1, wherein the analyzing takes into consideration a human weighting of importance.

7. The method of claim 1, wherein the analyzing takes into consideration an importance of a group associated with a sender of the one or more voice mail messages to identify the at least one important voice mail message.

8. The method of claim 1, wherein the analyzing takes into consideration an importance of a group associated with a sender of the one or more instant messages to identify the at least one important instant message.

9. The method of claim 1, wherein the analyzing takes into consideration an urgency of the one or more voice mail messages to identify the at least one important voice mail message.

10. The method of claim 1, wherein the analyzing takes into consideration an urgency of the one or more instant messages to identify the at least one important instant message.

11. A computer system for organizing voice mail messages and instant messages, comprising:
   a processor; and
   a memory storing computer-executable instructions that when executed by the processor cause the computer system to:
   receive one or more voice mail messages;
   perform speech recognition on the one or more voice mail messages to convert speech of the one or more voice mail messages to text of the one or more voice mail messages;
   receive one or more instant messages;
   analyze, by the computer system, the one or more voice mail messages and the one or more instant messages to identify at least one important voice mail message and at least one important instant message, wherein the at least one important voice mail message and the at least one important instant message are identified based at least in part on evaluating a user preference; and group the text of the at least one important voice mail message and the at least one important instant message.

12. The computer system of claim 11, wherein the analyzing is based on a rule set.

13. The computer system of claim 12, wherein the rule set is customized.

14. The computer system of claim 12, wherein at least one rule of the rule set is one of: heuristically based and empirically based.

15. The computer system of claim 12, wherein one or more rules of the rule set take into consideration a human weighting of importance.

16. The computer system of claim 11, wherein the analyzing takes into consideration an importance of a group associated with a sender of the one or more voice mail messages to identify the at least one important voice mail message.

17. The computer system of claim 11, wherein the analyzing takes into consideration an importance of a group associated with a sender of the one or more instant messages to identify the at least one important instant message.

18. The computer system of claim 11, wherein the analyzing takes into consideration an urgency of the one or more voice mail messages to identify the at least one important voice mail message.

19. The computer system of claim 11, wherein the analyzing takes into consideration an urgency of the one or more instant messages to identify the at least one important instant message.

20. A computer storage device storing computer executable instructions for organizing voice mail messages and instant messages, the computer executable instructions, when executed by a processor, cause a computer system to:

receive one or more voice mail messages;

perform speech recognition on the one or more voice mail messages to convert speech of the one or more voice mail messages to text of the one or more voice mail messages;

receive one or more instant messages;

analyze, by the computer system, the one or more voice mail messages and the one or more instant messages to identify at least one important voice mail message and at least one important instant message, wherein the at least one important voice mail message and the at least one important instant message are identified based at least in part on evaluating a user preference; and group the text of the at least one important voice mail message and the at least one important instant message.

* * * * *